United States Patent

Utsunomiya et al.

[11] Patent Number: 5,577,020
[45] Date of Patent: Nov. 19, 1996

[54] MAGNETO-OPTICAL DISC WITH INTERMEDIATE FILM LAYER BETWEEN A RECORDING FILM AND A DIELECTRIC FILM

[75] Inventors: Hajime Utsunomiya; Kenji Uchiyama; Masanori Kosuda; Hiroyasu Inoue, all of Nagano, Japan

[73] Assignee: TDK Corporation, Tokyo, Japan

[21] Appl. No.: 319,108

[22] Filed: Oct. 6, 1994

[30] Foreign Application Priority Data

Oct. 8, 1993 [JP] Japan ................................. 5-277666

[51] Int. Cl.$^6$ ........................... G11B 7/26; G11B 11/00
[52] U.S. Cl. .................... 369/275.2; 369/275.3; 369/13; 369/288; 360/59; 360/112; 365/122; 428/694 SC; 428/694 MM; 428/694 EC; 428/694 NF
[58] Field of Search ............................. 369/275.2, 275.3, 369/13, 288; 360/59, 112; 365/122; 428/694 SC, 694 MM, 694 EC, 694 NF

[56] References Cited

U.S. PATENT DOCUMENTS 5,361,248  11/1994  Hatwar et al. ..................... 369/275.2
5,398,219  3/1995  Itoh et al. ............................ 369/13
5,400,307  3/1995  Ochiai et al. ........................ 369/13

FOREIGN PATENT DOCUMENTS

0502425A2  9/1992  European Pat. Off.
59-129434  1/1986  Japan.
61-175310  2/1988  Japan.

Primary Examiner—Georgia Y. Epps
Attorney, Agent, or Firm—Watson Cole Stevens Davis, PLLC

[57] ABSTRACT

A magneto-optical disc is fabricated by forming a first dielectric film, a recording film of a rare earth element-transition element alloy, and a second dielectric film on a transparent substrate in the described order and further forming an intermediate film between the recording film and the second dielectric film. The second dielectric film contains at least one metal element and nitrogen. By depositing Ti, Cr or Nb to form an intermediate film of 1–28 Å thick, the disc is improved in magnetic field sensitivity and reliability. By depositing Co or Ni to form an intermediate film of 1–18 Å thick, the disc is improved in magnetic field sensitivity and reproduction stability.

13 Claims, 1 Drawing Sheet 5,577,020

MAGNETO-OPTICAL DISC WITH INTERMEDIATE FILM LAYER BETWEEN A RECORDING FILM AND A DIELECTRIC FILM

BACKGROUND OF THE INVENTION

1. Field of the Invention

This invention relates to a magneto-optical disc.

2. Prior Art

Optical discs are of great interest as high capacity information carrying media. Among the optical discs, magneto-optical discs of the magnetic field modulation system are expected to find use in data files or the like. A magneto-optical disc is recorded in a magnetic field modulation mode by directing a laser beam from an optical head to the recording layer of the disc in a DC manner for raising the temperature thereof and simultaneously applying a modulated magnetic field across the recording layer from a magnetic head opposed to the optical head. Therefore, the magnetic field modulation mode allows for overwrite recording.

Recently a magneto-optical disc of the magnetic field modulation mode (known as a mini-disc) which can record and reproduce signals at a low linear velocity equivalent to the linear velocity (1.2 to 1.4 m/s) of compact discs (CD) was put into commercial practice. This magneto-optical disc can share a drive unit with read-only optical discs of the specification complying with the CD. The potential applications of the drive unit for this magneto-optical disc include a portable type where it is required to reduce power consumption. However, the magneto-optical disc of the magnetic field modulation mode needs a recording magnetic head as well as an optical head, often leading to an increased power consumption. Therefore, there is a desire for a disc which is so sensitive to a magnetic field as to enable recording in a low magnetic field. The low magnetic field recording enables to reduce the power consumption, which in turn, enables a size reduction of a battery. There is also obtained an advantage in designing of the magnetic head in that the number of coil windings in the magnetic head can be reduced.

However, conventional magneto-optical discs, for example, 3.5-inch magneto-optical discs complying with the ISO standard generally require a recording magnetic field of 200 Oe or higher in order to provide a satisfactory C/N ratio. On the other hand, the above-mentioned mini-discs are desired to reduce the recording magnetic field to below 100 Oe, preferably below 80 Oe in order to minimize power consumption, and a C/N of at least 46 dB must be achieved at such a low magnetic field strength. It is further desired that at least 46 dB C/N be achieved at a recording magnetic field strength of 60 Oe in the future.

Further, the mini-discs must be more resistant against high temperature and high humidity because their outdoor use is an important consideration. Moreover, since the mini-discs are on the start of being utilized as data discs for computers too, a further improvement in safe data storage is required.

Japanese Patent Application Kokai (JP-A) No. 313835/ 1992 proposes "a method for preparing a magneto-optical recording medium by successively forming at least a rare earth element-transition metal alloy thin film and a dielectric film on a substrate wherein after the rare earth element-transition metal alloy thin film is formed, the substrate is maintained in an atmosphere in an electric discharge state, the atmosphere containing at least oxygen gas or a gas of a compound containing oxygen as one constituent element" and alleges that high C/N is accomplished in a low recording magnetic field. However, rare earth elements are highly oxidizable materials as is well known in the art and an experiment made by the inventors revealed that it was very difficult to control a gas of a compound containing oxygen as one constituent element ($CO_2$, etc.) to an optimum amount and it was difficult to achieve the desired properties in a consistent manner. Further, oxygen which is contained in the magnetic layer of rare earth element-transition metal alloy has an increased possibility to adversely affect reliability.

Besides, Ichitani et al., "Recording field sensitivity of magneto-optical disks using very thin exchange-coupled films", J. Magn. Soc., Jpn., Vol. 17, Supplement No. S1 (1993), pp. 196–200 describes that a high magnetic field sensitivity suitable for the magnetic field modulation mode is achievable by using a laminate film of GdFeCo and TbFeCo as the recording film. Since this method increases the number of steps, cost reduction is difficult.

DISCLOSURE OF THE INVENTION

An object of the present invention is to provide a magneto-optical disc having high magnetic field sensitivity and high reliability as well as a magneto-optical disc having high magnetic field sensitivity and good reproduction stability, at a low cost.

This and other objects are achieved by any one of the following embodiments (1) to (9).

(1) A magneto-optical disc comprising a first dielectric film, a recording film of a rare earth element-transition element alloy, and a second dielectric film on a transparent substrate in the described order, said disc further comprising an intermediate film between said recording film and said second dielectric film, wherein said second dielectric film contains at least one metal element and nitrogen, and said intermediate film is formed of Ti, Cr or Nb and has a thickness of 1 to 28 Å.

(2) A magneto-optical disc comprising a first dielectric film, a recording film of a rare earth element-transition element alloy, and a second dielectric film on a transparent substrate in the described order, said disc further comprising an intermediate film between said recording film and said second dielectric film, wherein said second dielectric film contains at least one metal element and nitrogen, and said intermediate film is formed of Co or Ni and has a thickness of 1 to 18 Å.

(3) The magneto-optical disc of (1) or (2) wherein said second dielectric film is formed of a metal nitride or a mixture of a metal nitride and at least one of a metal oxide, a metal carbide, and a metal sulfide.

(4) The magneto-optical disc of (1) or (2) wherein said recording film, said intermediate film, and said second dielectric film are formed by sputtering.

(5) The magneto-optical disc of (4) wherein said second dielectric film is formed by reactive sputtering.

(6) The magneto-optical disc of (1) or (2) further comprising a reflective film on said second dielectric film.

(7) The magneto-optical disc of (1) or (2) wherein said intermediate film is formed by sputtering in a rare gas atmosphere.

(8) The magneto-optical disc of (1) or (2) wherein said recording layer has an atomic composition: $R_aFe_bCo_c$ wherein R is at least one rare earth element, a+b+c=100, $10 \leq a \leq 35$, $55 \leq b \leq 75$, and $3 \leq c \leq 15$.

(9) The magneto-optical disc of (8) further containing up to 12 at % of Cr and/or Ti.

FUNCTION AND ADVANTAGE

According to the present invention, the intermediate film is provided between the recording film and the second dielectric film. The intermediate film is formed by depositing a selected metal, and the metal element in the intermediate film is different from the metal element in the adjacent second dielectric film.

The intermediate film has a function of suppressing interdiffusion between the elements of the second dielectric film and the elements of the recording film, thereby preventing deterioration of the magnetic properties of the recording film near its interface with the second dielectric film for improving the C/N upon recording in a low magnetic field. It is believed that the deterioration of the magnetic properties of the recording film near its interface with the second dielectric film is caused by nitrogen atoms which diffuse from the second dielectric film into the recording film during formation of the second dielectric film. When the second dielectric film is formed by reactive sputtering, atoms and ions resulting from the reactive gas (especially nitrogen gas) can damage the recording film so that the C/N upon recording in a low magnetic field is considerably deteriorated. The provision of the second dielectric film can prevent such damage.

The embodiment wherein the intermediate film is formed of Ti, Cr or Nb offers a reliable magneto-optical disc which degrades little during storage in severe conditions of high temperature and high humidity.

The other embodiment wherein the intermediate film is formed of Co or Ni ensures satisfactory stability during reproduction. Since power savings are required for mini-discs as previously mentioned, the discs must be improved in sensitivity to an applied magnetic field and laser light. However, where the mini-discs are used as data discs for computers, it is necessary to prevent the once recorded information from being accidentally erased by an external magnetic field or heating. The embodiment of the invention wherein the intermediate film is formed of Co or Ni enables stable reproduction because it is unlikely that the information is erased even when a magnetic field is externally applied during irradiation of reproducing laser light, for example.

It is noted that JP-A 258368/1993 discloses "a magneto-optical recording medium characterized in that an interference layer, a recording layer of a rare earth element-transition element amorphous alloy, a heat transfer layer of a metal or semiconductor having a thickness in the range of 10 to 30 Å, a dielectric layer, and a reflective layer are successively formed on a substrate." The heat transfer layer of this magneto-optical recording medium is analogous to the intermediate film of the present invention with respect to the metal formation and thickness, but different from the present invention because Al, Ag, Au, Cu, Si, and graphite are described in the publication as illustrative examples of the heat transfer layer. That is, the improvement in reliability and stability upon reproduction as achieved by the present invention are not achieved when the materials of the heat transfer layer described in the publication are used. Further, since the publication lacks empirical values of C/N at an external magnetic field strength of lower than 100 Oe, it is not admitted that the advantage of improved magnetic field sensitivity is demonstrated.

Also JP-A 313835/1992 referred to above contains a description which suggests that when a substrate having a magnetic film formed thereon is maintained in an atmosphere containing oxygen gas or a gas of an oxygen-containing compound at about $1.6 \times 10^{-5}$ to $1 \times 10^{-3}$ Torr in an electric discharge state, a layer of an oxygen-containing composition is formed at the top of the magnetic film, which layer prevents entry of elements (N, $N^+$, etc.) from the dielectric film into the magnetic film. Although the invention of the publication is analogous to the present invention with respect to the prevention of entry of nitrogen into the magnetic film, the method of maintaining the magnetic film in an atmosphere containing oxygen gas or the like in an electric discharge state is difficult to provide the desired properties in a consistent manner as previously mentioned.

Further, Japanese Patent Publication (JP-B) No. 32816/1993 proposes to form a corrosion resistant layer having a thickness of 30 to 100 Å and containing 0.1 to 20 at % of oxygen atom by sputtering a recording layer-forming target in an oxygen-containing atmosphere or sputtering an oxide target after a recording layer is formed. This proposal aims to prevent corrosion of the recording layer while no reference is made to C/N in the publication. The advantages of the present invention are not achieved by the method of forming a film on the recording layer by the sputtering in an oxygen-containing atmosphere or the sputtering using an oxide target.

Further, JP-A 252443/1992 proposes to prevent a recording film from corrosion by modifying the recording film at its surface with an oxygen plasma. In Example of the publication, a recording film is subject to reactive dry etching while introducing oxygen gas, thereby forming a modified oxide film of about 50 Å thick. A C/N ratio of 47 dB is reported in the publication although an improvement in C/N under a low magnetic field of lower than 100 Oe is described nowhere. The advantages of the present invention are not achieved by this method as well.

Unlike these prior art methods, the present invention forms an intermediate film by sputtering in a rare gas so that a high C/N ratio under a low magnetic field is available in a consistent manner.

JP-A 297738/1990 discloses "an information recording optical disc wherein a protective layer of an oxide such as $SiO_2$ and $Al_2O_3$ or a nitride such as AlN and $Si_3N_4$ is formed on a gas-permeable plastic molded disc, a magneto-optical recording film layer is formed on the protective layer, and another protective layer of the same composition as the former is formed on the recording layer, wherein an intermediate layer of Ti or Zr is formed between each protective layer and the recording layer." The intermediate layer described in this publication is provided for preventing transmission of water vapor and oxygen by getter action. It is described in the publication that the intermediate layer should preferably be at least 30 Å thick in order to effectively prevent transmission and is 50 to 100 Å in Examples.

Also JP-A 115258/1986 discloses "a magneto-optical recording medium having a recording layer in the form of an amorphous film of a RE-TM system alloy wherein RE is at least one element selected from rare earth elements and TM is at least one element selected from transition metal elements wherein a layer of at least one metal selected from Ti, Cr and Al is applied onto the amorphous film as a surface layer." A metal protective film of 100 nm thick is provided as the surface layer in Example of the publication. The thickness range of the metal protective film is not disclosed in the publication. The metal protective film serves as an oxygen getter for preventing oxygen from entering the recording layer. It is not disclosed in the publication to additionally form a dielectric film on the surface layer.

Also JP-A 96951/1990 discloses "a magneto-optical recording medium having at least a metal protective layer as a protective layer wherein the metal protective layer is formed of a titanium alloy consisting of Ti and M wherein M is at least one element selected from the group consisting of Re, Cr, and Ta." It is described that the metal protective layer is effective for prohibiting entry of oxygen, nitrogen, fluorine, water or the like from the dielectric film into the recording layer. In Example of the publication, a titanium alloy film of about 15 Å thick is formed between the dielectric layer near the substrate and the magneto-optical recording layer and a titanium alloy film of about 500 Å thick is formed on the magneto-optical recording layer. In Comparative Example of the publication, a titanium film of about 500 Å thick is formed on the magneto-optical recording layer. However, the thickness ranges of the titanium alloy and titanium films formed on the magneto-optical recording layer are disclosed nowhere in the publication.

The intermediate layer or metal protective layer disclosed in these publications is provided for the purpose of preventing entry of oxygen, water or the like into the recording layer and it is required for that purpose that the layer be formed to a thickness of 30 to 1,000 Å on the recording layer. In contrast, the present invention forms an intermediate film on a recording film for the purpose of improving magnetic field sensitivity and therefore, a thickness of more than 30 Å is seriously detrimental to the intended improvement in magnetic field sensitivity.

In addition, JP-A 43848/1987 discloses "a magneto-optical recording medium wherein a perpendicular magnetizable film consisting essentially of a rare earth element and a transition metal is formed on a non-magnetic substrate through an underlying layer in the form of a soft magnetic layer capable of inducing sufficient strain anisotropy to increase the coercivity of the perpendicular magnetizable film, and a soft magnetic film is formed on the perpendicular magnetizable film." The soft magnetic film described in the publication is provided for the purpose of closing the magnetic flux extending from the perpendicular magnetizable film, thereby stabilizing written magnetic domains. In Example of the publication, Fe films of 20 Å thick are formed above and below the perpendicular magnetizable film, but no dielectric film is formed. The thickness range of the soft magnetic layer formed on the perpendicular magnetizable film is disclosed nowhere in the publication.

ILLUSTRATIVE CONSTRUCTION

Figure 1:
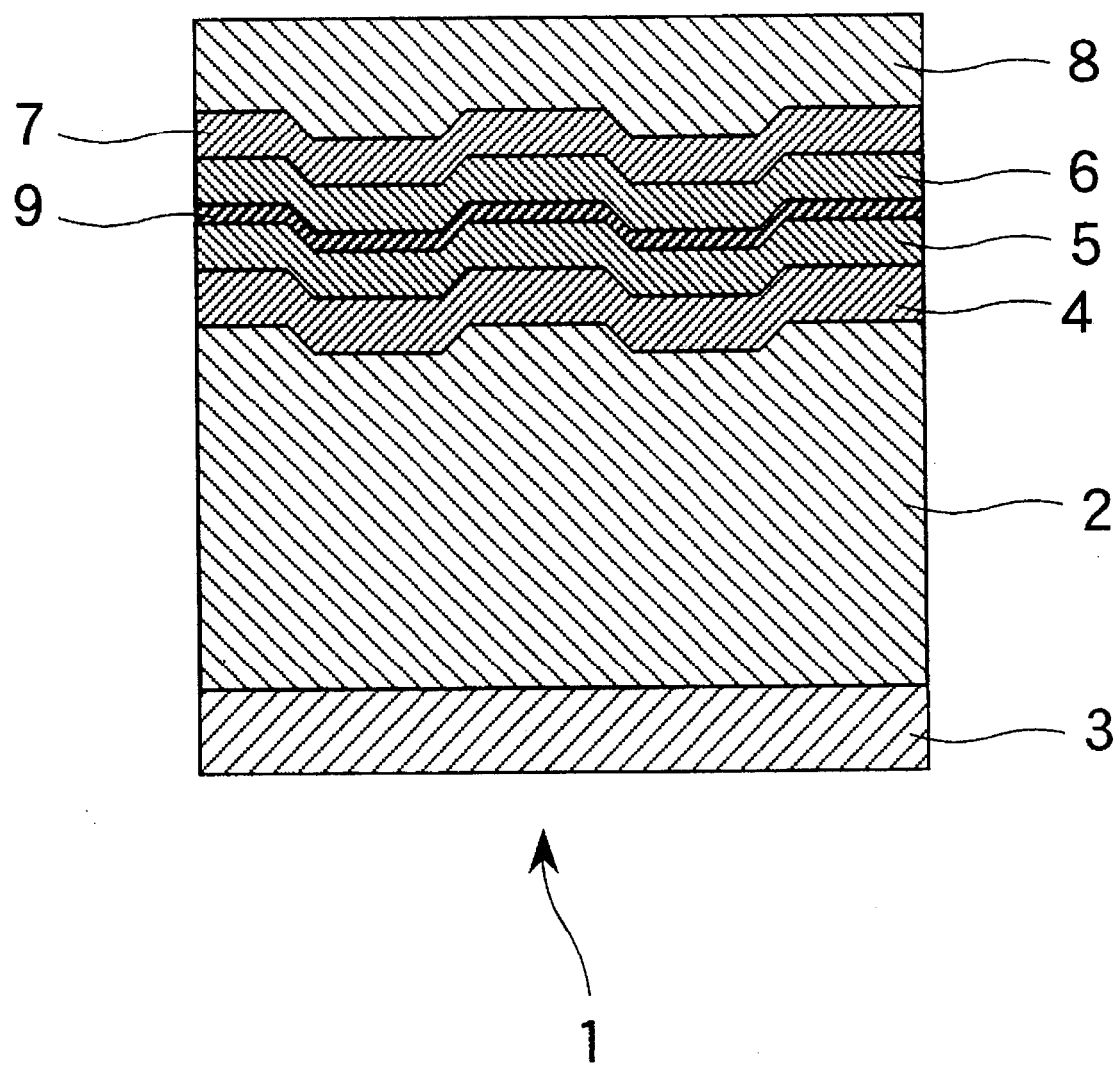
FIGURE 1 is a partial cross-sectional view of one exemplary arrangement of a magneto-optical disc according to the present invention.

Now the illustrative construction of the present invention is described in detail.

FIGURE 1 illustrates one exemplary arrangement of a magneto-optical disc according to the present invention. The magneto-optical disc 1 includes a first dielectric film 4, a recording film 5, a second dielectric film 6, a reflective film 7, and a protective coat 8 on one surface of a transparent substrate 2, and an intermediate film 9 is provided between the recording film 5 and the second dielectric film 6.

In recording and reproducing signals in and from the magneto-optical disc of the present invention, an optical head is placed on the rear surface side (the lower side in the figure) of the transparent substrate 2 to irradiate laser light through the transparent substrate 2. For the transparent substrate, glass and transparent resins such as polycarbonate, acrylic resin, amorphous polyolefin, and styrene resin are used.

The first dielectric film 4 and second dielectric film 6 have functions of improving C/N and preventing corrosion of the recording film. The first dielectric film has a thickness of about 40 to about 200 nm and the second dielectric film has a thickness of about 10 to about 100 nm. The first dielectric film is preferably formed from metal nitrides, oxides, carbides and sulfides alone or a mixture of two or more. The second dielectric film is preferably formed of a metal nitride or a mixture of a metal nitride and at least one of metal oxides, carbides and sulfides. In this regard, the metal is preferably Si, Al or Zn alone or in admixture with La, Ce, Nd, Y, etc. N preferably occupies 30 to 100% of the total of N, O, C and S. With the second dielectric film formed as just described herein, a high recording sensitivity and a high C/N ratio are available and degradation of the recording film is reduced. Each dielectric film contains one or more metal elements while the combination of metal elements is not particularly limited. The first and second dielectric films need not be composed of the same elements.

The recording film 5 is such that information can be magnetically recorded using a modulated heat beam or a modulated magnetic field and the recorded information be reproduced through magneto-optical conversion. The magneto-optical disc of the invention is generally adapted for the magnetic field modulation mode. The recording film 5 is made of an alloy containing a rare earth element and a transition element. Preferably the rare earth element is at least one element selected from Tb, Dy, Nd, Sm, Pr and Ce and the transition element is essentially Fe and optionally contains Co. The specific contents of respective elements may be suitably determined in accordance with the required Curie temperature, coercivity, and reproducing properties. Often an atomic composition: $R_a Fe_b Co_c$ wherein R is a rare earth element, $10 \leq a \leq 35$, $55 \leq b \leq 75$, $3 \leq c \leq 15$, and $a+b+c=100$ is preferred. In addition to these elements, various elements such as Cr and Ti may be added if desired, but the content of these additive elements in the recording film is preferably up to 12 at %. Especially preferred as the additive element is Cr and/or Ti, which are desirably contained in a total amount of 1 to 10 at %. Specific compositions are, for example, Tb—Fe—Co, Tb—Fe—Co—Cr, Tb—Fe—Co—Ti, Tb—Fe—Co—Cr—Ti, Dy—Tb—Fe—Co, and Nd—Dy—Fe—Co. The recording film 5 generally has a thickness of about 10 to about 100 nm.

The intermediate film 9 is formed from Ti, Cr or Nb or formed from Co or Ni. The embodiment wherein the intermediate film 9 is formed from Ti, Cr or Nb provides a magneto-optical disc which is improved in reliability whereas the embodiment wherein the intermediate film 9 is formed from Co or Ni provides a magneto-optical disc which is improved in reproduction stability.

The lower limit of thickness of the intermediate film is 1 Å, preferably 2 Å. The upper limit of thickness is 28 Å, preferably 18 Å, more preferably 8 Å for the intermediate film formed from Ti, Cr or Nb and 18 Å, preferably 10 Å, more preferably 9 Å for the intermediate film formed from Co or Ni. By controlling the intermediate film to an appropriate thickness, it becomes possible to obtain a satisfactory C/N ratio of at least 46 dB at a low magnetic field strength of up to 80 Oe. If the intermediate film is too thin, the C/N ratio upon recording at a low magnetic field is significantly lowered, which leads to an increased burden of the magnetic head and hence, an increased power consumption. If the intermediate film is too thick, the benefit of improving the C/N at a low magnetic field is substantially lost.

It is to be noted that in the present specification, the thickness of respective films is calculated from a sputtering rate and a sputtering time. The sputtering rate used for film thickness calculation is determined by sputtering under the same conditions as the actual film deposition for a long time to form a thick film, actually measuring the thickness of the film, and calculating from the measured thickness and the sputtering time.

The intermediate film is a deposit of metal, for example, a deposit obtained by sputtering a metal target as will be described later. When elemental analysis is performed in the proximity of the intermediate film as by Auger electron spectrometry, elements contained in the dielectric films, elements contained in the recording film, or impurities such as argon, oxygen and nitrogen contained in the atmosphere used during deposition of respective films are often detected. Since the intermediate film is extremely thin, the proportion in the intermediate film of those elements which have entered the intermediate film from the dielectric film due to diffusion is relatively high as compared with the other contaminant elements. Such an intermediate film is also encompassed in the present invention. Since the thickness of the intermediate film is calculated from the sputtering rate and time, it is presumed that a thickness as thin as about 1 to 2 Å can include a situation where no substantial film form is set up. However, as long as film deposition is carried out to form a film of 1 to 2 Å thick on calculation, the benefit of improving C/N is fully accomplished even when no film form is actually set up.

For the formation of dielectric films, it is preferred to use a sputtering technique. The benefits of the invention are accomplished when either ordinary sputtering or reactive sputtering is used. Note that although dielectric films containing oxygen and nitrogen, for example, dielectric films containing La, Si, O and N (LaSiON films) are generally formed by sputtering, they may also be formed by a reactive sputtering technique using an oxide target in a nitrogen-containing atmosphere. The benefits of the present invention become enhanced particularly when the second dielectric film is formed under such conditions that the N content of the film may be 15 at % or higher.

The intermediate film is formed in a rare gas atmosphere while no oxygen is introduced into a vacuum chamber, with a trace amount of oxygen being often left in the vacuum chamber. Consequently, on elemental analysis as by Auger electron spectrometry, oxygen is detectable in the proximity of the intermediate film even when the dielectric films are free of oxygen. Depending on a particular method of forming the intermediate film, the oxygen content can sometimes be slightly increased near the interface between the intermediate film and the recording film. In the practice of the invention, the maximum oxygen content near the interface is preferably up to 25 at %, more preferably up to 20 at % even in such cases. By suppressing the maximum oxygen content low, reliability and repetitive endurance are improved and a high C/N is consistently achieved upon recording at a high magnetic field and high temperature. In contrast, if the oxygen content is too high, the rare earth element in the recording film is selectively oxidized to lower the coercive force of the recording film so that recording at a high magnetic field and high temperature may have influence on adjacent tracks. It is to be noted that although the present invention aims to accomplish a high C/N ratio upon recording in a low magnetic field, satisfactory properties upon recording in a high magnetic field must also be insured before the invention can be used as a recording medium.

For controlled entry of oxygen into films, the ultimate pressure reached in the vacuum chamber should preferably be as low as possible. However, it suffices that the ultimate pressure in the vacuum chamber be up to $1 \times 10^{-4}$ Pa because satisfactory performance is obtained with an oxygen content within the above-mentioned range.

Otherwise, the sputtering conditions are not particularly limited and conventional well-known conditions are acceptable.

The reflective film 7 is not essential, but preferably provided for C/N improvement. The material of which the reflective film 7 is formed is preferably a metal such as Au, Ag, Pt, Al, Ti, Cr, Ni and Co or an alloy thereof or a compound thereof. The reflective film 7 is preferably formed by sputtering. The reflective film 7 preferably has a thickness of about 30 to about 200 nm.

The protective coat 8 is a resin film which is provided for the purpose of protecting the sputtered films stacked up to the reflective film 7. The resin of which the protective coat 8 is formed is not particularly limited, but preferably a cured product of a radiation curable compound. A preferred radiation curable compound is one having an acrylic group. Preferably a coating containing such a radiation curable compound and a photo-polymerization sensitizer or initiator is cured with UV radiation or electron radiation to form a protective coat. The protective coat 8 is generally 1 to 30 μm thick, preferably 2 to 20 μm thick. If the film thickness is too thin, it would be difficult to form a uniform film, resulting in a loss of durability. A too thick film would crack due to shrinkage upon curing or tend to cause the disc to deflect.

It is understood that a transparent hard coat 3 may be formed on the rear surface of the transparent substrate 2 as shown in the figure. The material and thickness of the hard coat may be the same as the protective coat 8. The hard coat is preferably rendered anti-static by adding a surfactant, for example. The hard coat need not be limited to the disk major surface, but may be provided on the outer and inner peripheral edges.

EXAMPLE

Examples of the present invention are given below by way of illustration.

Magneto-optical disc samples as shown in the following Tables were fabricated by successively forming on a transparent substrate, a first dielectric film, a recording film, an intermediate film, a second dielectric film, a reflective film, and a protective coat under the conditions shown below.

Transparent Substrate

The transparent substrate used was a disc-shaped polycarbonate resin sheet having an outer diameter of 64 mm, an inner diameter of 11 mm and a thickness of 1.2 mm.

First Dielectric Film

A vacuum chamber was evacuated to a vacuum of below $5.0\times10^{-5}$ Pa. While Ar and $N_2$ gases were passed through the vacuum chamber, reactive magnetron sputtering was carried out using Si as the target, forming a first dielectric film. The sputtering conditions were shown below.

input power: 1 kW
sputtering gas pressure: 0.1 Pa
Ar gas flow rate: 31 SCCM
$N_2$ gas flow rate: 19 SCCM The first dielectric film was 60 nm thick.

Recording Film

After the first dielectric film was formed, the vacuum chamber was evacuated again to below $5.0\times10^{-5}$ Pa. While Ar gas was passed through the vacuum chamber, magnetron sputtering was carried out using a Tb—Fe—Co system alloy as the target, forming a recording film composed mainly of Tb—Fe—Co. The sputtering conditions were shown below.

input power: 1 kW
sputtering gas pressure: 0.2 Pa
Ar gas flow rate: 98 SCCM

The recording film was 20 nm thick. The recording film had a composition of $Tb_{20.0}Fe_{70.0}Co_{7.0}Cr_{3.0}$ in atomic ratio.

Intermediate Film

After the recording film was formed, the vacuum chamber was evacuated again to below $5.0\times10^{-5}$ Pa. While Ar gas was passed through the vacuum chamber, magnetron sputtering was carried out using the target shown in Table 1, forming an intermediate film. The sputtering conditions were shown below.

input power: 400 W
sputtering gas pressure: 0.1 Pa
Ar gas flow rate: 40 SCCM

The intermediate film had a thickness as shown in Tables. Note that some samples had no intermediate film formed.

Second Dielectric Film

After the intermediate film was formed, the vacuum chamber was evacuated again to below $5.0\times10^{-5}$ Pa. A second dielectric film was formed by sputtering using the target shown in Tables. "Si(N)" or "Al(N)" in the target column in the respective Tables means that reactive magnetron sputtering was carried out using a Si or Al target while passing Ar and $N_2$ gases through the vacuum chamber. The reactive sputtering conditions were shown below.

input power: 1 kW
sputtering gas pressure: 0.1 Pa
Ar gas flow rate: 31 SCCM
$N_2$ gas flow rate: 19 SCCM When LaSiON which was a sintered target was used, magnetron sputtering was carried out under the following conditions.

input power: 1 kW
sputtering gas pressure: 0.1 Pa
Ar gas flow rate: 31 SCCM

The second dielectric film was 20 nm thick.

Reflective Film

After the second dielectric film was formed, the vacuum chamber was evacuated again to below $5.0\times10^{-5}$ Pa. While Ar gas was passed through the vacuum chamber, magnetron sputtering was carried out using an Al alloy as the target, forming a reflective film. The sputtering conditions were shown below.

input power: 750 W
sputtering gas pressure: 0.15 Pa
Ar gas flow rate: 10 SCCM

The reflective film was 60 nm thick.

Protective Coat

A coating of the following polymerizable composition was formed by spin coating and exposed to UV radiation for curing. After curing, the coat had an average thickness of about 5 μm.

| Polymerizable composition | Parts by weight |
| --- | --- |
| Oligoester acrylate (molecular weight 5,000) | 50 |
| Trimethylolpropane triacrylate | 50 |
| Acetophenone photo-polymerization initiator | 3 |

In the magneto-optical disc samples thus obtained, 3T signals of EFM were recorded at a linear velocity of 1.28 m/s and an external magnetic field strength (Hex) shown in Tables. Using a MD rating system MJ-6100 manufactured by Sony Techtronics K.K., C/N was measured. The results are shown in Tables.

Also the samples shown in Table 1 were evaluated for reliability by storing the samples in an environment of 90° C. and RH 85% and measuring the storage time passed until the block error rate increased twice the initial. The results are shown in Table 1.

Further the samples shown in Table 2 were evaluated for reproduction stability. First 3T signals were recorded in the samples at a linear velocity of 1.28 m/s and an external magnetic field strength of 100 Oe. Next, with an external magnetic field of 200 Oe applied at a temperature of 70° C., only one track was reproduced $1\times10^6$ cycles at a linear velocity of 1.28 m/s. The maximum reproduction power was determined at which a C/N lowering of 2 dB or less from the initial reproduction occurred. The results are shown in Table 2. As the maximum reproduction power becomes greater, the signals are less likely to be erased by error during reproduction, that is, safe data storage is improved.

Some comparative samples are redundantly reported in both Tables 1 and 2.

TABLE 1

| | Target | | Intermediate | C/N (dB) | | |
| | Inter-mediate film | Second dielectric film | film thickness (Å) | Hex = 60 Oe | Hex = 80 Oe | Reliability (hrs.) |
| Sample No. | | | | | | |
| --- | --- | --- | --- | --- | --- | --- |
| 1 (comparison) | — | Si(N) | — | 41.5 | 44.0 | 1500 |
| 2 (comparison) | Al | Si(N) | 5 | 46.5 | 47.5 | 1500 |

TABLE 1-continued

| | Target | | | C/N (dB) | | |
|---|---|---|---|---|---|---|
| Sample No. | Intermediate film | Second dielectric film | Intermediate film thickness (Å) | Hex = 60 Oe | Hex = 80 Oe | Reliability (hrs.) |
| 3 (comparison) | Al | Si(N) | 10 | 46.5 | 47.5 | 1500 |
| 4 (comparison) | Al | Si(N) | 18 | 46.0 | 47.0 | 1500 |
| 5 (comparison) | Cu | Si(N) | 10 | 46.0 | 47.0 | 1300 |
| 6 (comparison) | Au | Si(N) | 10 | 45.5 | 47.0 | 1500 |
| 7 (comparison) | Ag | Si(N) | 10 | 46.0 | 47.0 | 1300 |
| 8 (comparison) | Zr | Si(N) | 10 | 46.5 | 47.5 | 1500 |
| 101 | Cr | Si(N) | 2 | 47.0 | 47.5 | >2000 |
| 102 | Cr | Si(N) | 5 | 47.0 | 47.5 | >2000 |
| 103 | Cr | Si(N) | 8 | 46.5 | 47.5 | >2000 |
| 104 | Cr | Si(N) | 10 | 46.0 | 47.0 | >2000 |
| 105 | Cr | Si(N) | 18 | 46.0 | 47.0 | >2000 |
| 106 | Cr | Si(N) | 28 | 43.5 | 46.0 | >2000 |
| 107 (comparison) | Cr | Si(N) | 35* | 39.5 | 43.0 | >2000 |
| 108 | Ti | Si(N) | 5 | 47.0 | 47.5 | >2000 |
| 109 | Ti | Si(N) | 10 | 46.5 | 47.5 | >2000 |
| 110 (comparison) | Ti | Si(N) | 30* | 42.5 | 45.5 | >2000 |
| 111 | Nb | Si(N) | 5 | 47.0 | 47.5 | >2000 |
| 112 | Nb | Si(N) | 10 | 46.0 | 46.5 | >2000 |
| 113 (comparison) | Nb | Si(N) | 30* | 42.5 | 45.5 | >2000 |

*values outside the scope of the invention

TABLE 2

| | Target | | | C/N (dB) | | Reproduction |
|---|---|---|---|---|---|---|
| Sample No. | Intermediate film | Second dielectric film | Intermediate film thickness (Å) | Hex = 60 Oe | Hex = 80 Oe | stability (mW) |
| 1 (comparison) | — | Si(N) | — | 41.5 | 44.0 | 1.4 |
| 2 (comparison) | Al | Si(N) | 5 | 46.5 | 47.5 | 1.4 |
| 3 (comparison) | Al | Si(N) | 10 | 46.5 | 47.5 | 1.4 |
| 4 (comparison) | Al | Si(N) | 18 | 46.0 | 47.0 | 1.4 |
| 5 (comparison) | Cu | Si(N) | 10 | 46.0 | 47.0 | 1.4 |
| 6 (comparison) | Au | Si(N) | 10 | 45.5 | 47.0 | 1.4 |
| 7 (comparison) | Ag | Si(N) | 10 | 46.0 | 47.0 | 1.4 |
| 8 (comparison) | Zr | Si(N) | 10 | 46.5 | 47.5 | 1.4 |
| 101 | Co | Si(N) | 2 | 47.0 | 47.5 | >1.8 |
| 102 | Co | Si(N) | 5 | 46.5 | 47.5 | >1.8 |
| 103 | Co | Si(N) | 9 | 46.0 | 47.5 | >1.8 |
| 104 | Co | Si(N) | 18 | 43.5 | 46.0 | >1.8 |
| 105 (comparison) | Co | Si(N) | 20* | 40.0 | 44.0 | >1.8 |
| 106 | Ni | Si(N) | 5 | 46.5 | 47.5 | >1.8 |
| 107 | Ni | Si(N) | 9 | 46.0 | 47.5 | >1.8 |
| 108 (comparison) | Ni | Si(N) | 20* | 40.0 | 44.0 | >1.8 |

*values outside the scope of the invention

The effectiveness of the invention is evident from the foregoing data. As previously mentioned, the mini-discs are desired to have at least 46 dB C/N upon recording in a low magnetic field of up to 100 Oe, especially up to 80 Oe. All the inventive samples having an intermediate film which was formed from a selected metal to a predetermined thickness provided at least 46.0 dB C/N at 80 Oe. Very high C/N ratios were obtained particularly when the intermediate film was less than 10 Å thick.

As further shown in Table 1, the inventive samples having an intermediate film which were formed from Cr, Ti or Nb to a predetermined thickness were more reliable than the comparative samples having an intermediate film of Al. As also shown in Table 2, the inventive samples having an intermediate film which were formed from Co or Ni to a predetermined thickness showed better reproduction stability than the comparative samples having an intermediate film of Al.

Next, the oxygen content in the proximity to the intermediate film was measured by Auger electron spectrometry. After the protective coat was removed from each sample, the sample was placed in a vacuum chamber of an Auger electron spectrometer. The container was evacuated for 24 hours until a pressure of $7.0 \times 10^{-10}$ Torr was reached. With evacuation further continued, the element distribution was measured in a thickness direction by Auger electron spectrometry. The Auger electron spectrometry included the following conditions.

Electron gun accelerating voltage: 5 kV
Electron gun irradiating current: 500 nA
Ion gun accelerating voltage: 2 kV Argon ion incident angle: 58.9°

The quantity of elements was measured by etching the sample with argon ions in a thickness direction in an intermittent etching mode (single etching duration 45 seconds). The etching rate was 13.2 Å/min. for the second dielectric film and 12.2 Å/min. for the recording film. As a result, a peak attributable to oxygen was observed in proximity to the interface between the intermediate film and the recording film of each sample. The oxygen content corresponding to the peak was up to 21 at %.

We claim:

1. A magneto-optical disc comprising a first dielectric film, a recording film of a rare earth element-transition element alloy, and a second dielectric film on a transparent substrate in the described order, said disc further comprising an intermediate film between said recording film and said second dielectric film and a reflective film on said second dielectric film, wherein:

said recording film has an atomic composition: $R_a Fe_b Co_c$ wherein R is at least one rare earth element, a+b+c=100, $10 \leq a \leq 35$, $55 \leq b \leq 75$, and $3 \leq c \leq 15$, said second dielectric film contains at least one metal element and nitrogen, and said intermediate film is formed of Ti, Cr, or Nb and has a thickness of 1 to 28 A.

2. A magneto-optical disc comprising a first dielectric film, a recording film of a rare earth element-transition element alloy, and a second dielectric film on a transparent substrate in the described order, said disc further comprising an intermediate film between said recording film and said second dielectric film and a reflective film on said second dielectric film, wherein:

said recording film has an atomic composition: $R_a Fe_b Co_c$ wherein R is at least one rare earth element, a+b+c=100, $10 \leq a \leq 35$, $55 \leq b \leq 75$, and $3 \leq c \leq 15$, said second dielectric film contains at least one metal element and nitrogen, and said intermediate film is formed of Co or Ni and has a thickness of 1 to 18 A.

3. The magneto-optical disc of claim 1 wherein said second dielectric film is formed of a metal nitride or a mixture of a metal nitride and at least one of a metal oxide, a metal carbide, and a metal sulfide.

4. The magneto-optical disc of claim 1 wherein said recording film, said intermediate film, and said second dielectric film are formed by sputtering.

5. The magneto-optical disc of claim 4 wherein said second dielectric film is formed by reactive sputtering.

6. The magneto-optical disc of claim 1 wherein said intermediate film is formed by sputtering in a rare gas atmosphere.

7. The magneto-optical disc of claim 1 wherein said recording layer has an atomic composition: $R_a Fe_b Co_c$ wherein R is at least one rare earth element, a+b+c=100, $10 \leq a \leq 35$, $55 \leq b \leq 75$, and $3 \leq c \leq 15$.

8. The magneto-optical disc of claim 1 further containing up to 12 at % of Cr and/or Ti.

9. The magneto-optical disc of claim 2, wherein said second dielectric film is formed of a metal nitride or a mixture of a metal nitride and at least one of a metal oxide, metal carbide and a metal sulfide.

10. The magneto-optical disc of claim 2, wherein said recording film, said intermediate film and said second dielectric film are formed by sputtering.

11. The magneto-optical disc of claim 10, wherein said second dielectric film is formed by reactive sputtering.

12. The magneto-optical disc of claim 2, wherein said intermediate film is formed by sputtering in a rare gas atmosphere.

13. The magneto-optical disc of claim 2, further comprising up to 12 at % of Cr and/or Ti.

* * * * *